United States Patent
Hammen (10) Patent No.: US 6,532,305 B1
(45) Date of Patent: Mar. 11, 2003

(54) MACHINE LEARNING METHOD

(75) Inventor: David G. Hammen, League City, TX (US)

(73) Assignee: Lincom Corporation, Houston, TX (US)

( * ) Notice: Subject to any disclaimer, the term of this patent is extended or adjusted under 35 U.S.C. 154(b) by 0 days.

(21) Appl. No.: 09/369,110

(22) Filed: Aug. 5, 1999

Related U.S. Application Data (60) Provisional application No. 60/095,305, filed on Aug. 4, 1998.

(51) Int. Cl.$^7$ .............................. G06K 9/62; G06K 9/70; G06E 1/00
(52) U.S. Cl. ...................... 382/227; 382/159; 382/160; 382/224; 382/226; 382/228; 706/20; 706/25
(58) Field of Search ................................ 382/156–157, 382/159, 160, 173, 180, 181, 190, 224, 226, 227, 228, 155; 704/231, 232, 240, 254, 255; 706/15, 20, 25

(56) References Cited

U.S. PATENT DOCUMENTS

| | | | |
|---|---|---|---|
| 5,263,124 A | * 11/1993 | Weaver et al. | 382/159 |
| 5,371,809 A | * 12/1994 | Desieno | 382/159 |
| 5,657,424 A | * 8/1997 | Farrell et al. | 704/255 |
| 5,787,274 A | * 7/1998 | Agrawal et al. | 707/102 |
| 6,058,205 A | * 5/2000 | Bahl et al. | 382/159 |

OTHER PUBLICATIONS

Lee, et al. "Training of a Neural Network Classifier by Combining Hyper-plane with Exemplar Approach", IEEE, pp. 494–499, 1993.*

Valova, et al. "MR Brain Image Classification by Multimodal Perceptron Tree Neural Network", IEEE, pp. 189–198, 1997.*

* cited by examiner

*Primary Examiner*—Leo Boudreau
*Assistant Examiner*—Daniel G. Mariam
(74) *Attorney, Agent, or Firm*—Buskop Law Group, P.C.; Wendy Buskop (57) ABSTRACT

A method of machine learning utilizing binary classification trees combined with Bayesian classifiers in which a training component includes creating nodes, utilizing the expectation maximization algorithm to create statistical kernels and mixtures for leaf nodes and kappa statistics to identify nodes as leaf nodes or branch nodes, creating hyperplanes for branch nodes, splitting the training data for branch nodes into subsets to be provided to subtrees, and in which an operating component traverses a binary classifier tree with a feature vector to be classified by determining for each branch node whether the feature vector lies to the left or the right of the branch node hyperplane and finally classifies the feature vector upon arriving at a leaf node by computing log likelihoods for the feature vector for each mixture in the leaf node and determining the classification of the feature vector according to the highest log likelihood, in which the preferred embodiment described is classification of internal combustion engine cylinder firings as nominal firings or misfires.

8 Claims, 6 Drawing Sheets

Microfiche Appendix Included
(2 Microfiche, 318 Pages)

| $N_{00}$ True Positives | $N_{01}$ False Negatives |
|---|---|
| $N_{10}$ False Positives | $N_{11}$ True Negatives |

MACHINE LEARNING METHOD

This application claims the benefit of the earlier filing date, Aug. 4, 1998, of the provisional application entitled Machine Learning Method, having application No. 60/095,305.

MICROFICHE APPENDIX

The source code for the preferred embodiment, the example of the classification of engine firing conditions, is included with this application as Microfiche Appendix. The total number of microfiche is two (2) and the total number of frames is three hundred eighteen (318).

BACKGROUND

The invention is a machine learning method for pattern recognition or data classification. The preferred embodiment described is for detecting or identifying misfires in an automotive engine. The terms "pattern recognition" and "classification" are substantially synonymous because the underlying problem of pattern recognition is deciding how to classify elements of data as either belonging or not belonging to a pattern.

The method of the invention is a hybrid of two known separate methods, classifier trees and Bayesian classifiers. The invention constructs a mapping from known inputs to known outputs, which is a general quality of machine learning techniques. The machine learning technique used in this invention is a novel hybrid of two existing techniques: binary classifier trees and Bayesian classifiers. A tree is a data structure having nodes connected by branches terminating in leaves. A binary tree is a tree in which the nodes branch to no more than two subnodes or leaves. A classifier tree is a tree used for classification in which the leaf nodes indicate the classification of the data being classified.

During classification operations, one simply traverses the tree according to some tree traversal method. The leaf reached by the traversal contains the classification of the input data, the data to be classified. In fact, it is the usual practice of prior art to store in each leaf only the classification result. Tree structures having only classifications in the leaves are commonly very complex because all the data needed to search and find the leaf bearing the classification must be available for traversal in branches. The requirement for all classification data to be available in the branches leading to the leaves results in extremely complex trees, trees so complex and therefore so difficult to operate that it is a common practice of prior art to simply prune portions of the tree in order to simply operation, despite the fact that such pruning results in at least some level of inaccuracy in classification.

Bayesian classifiers are statistical techniques that take advantage of Bayes' Law, a well-known statistical equation. Simple Bayesian classifiers model classes of data as Gaussian kernels, multi-dimensional Gaussian probability distributions defined by statistical moments such as means and covariances. Advanced Bayesian classifiers model classes of data as mixtures of kernels, combinations of kernels with statistical weighting factors. Bayesian classifiers use statistics such as means and covariances abstracted from training data to construct kernels and mixtures. Bayesian classifiers use the kernels and mixtures so constructed in conjunction with distance metrics to classify data.

Simple Bayesian classifiers only work well when the training data and classification data are both normally distributed because of their reliance on statistical moments that lose validity as data patterns vary from the traditional bell curve. The normal distribution includes the well-known bell curve with only one peak or "mode." Advanced Bayesian classifiers can work with data that is somewhat multi-modal because their inclusion of multiple weighted kernels in mixtures can have the effect of aligning kernels with pockets of normality in the data. Nevertheless, when the number of modes becomes high, the known techniques for separating data meaningfully into kernels fails because of well-identified singularities in all known algorithms for separating data into kernels. This is a problem because the modality is high for many of the interesting tasks of data classification or pattern recognition.

It is noted in passing that neural networks are also used in the area of data classification and pattern recognition. Neural networks are so different in structure, operation, and detail from tree classifiers and Bayesian classifiers, and therefore so different from the present invention, however, that neural networks are not considered relevant art with respect to the present invention.

SUMMARY

The present invention combines the strengths of binary tree classifiers and Bayesian classifiers in a way that reduces or eliminates their weaknesses to provide a strong solution to the problem of classifying multi-modal data. A tree-based approach is very good at handling datasets that are intrinsically multi-modal. The present invention solves the problem of tree complexity by replacing the classification at the leaves with a Bayesian classifier, which means that the intervening branch nodes are no longer required to contain all the data needed to perform the classification. Some of the burden is transferred to the leaf nodes themselves. In addition, the dataset size of the training data used to create the classification mixtures in the leaf nodes has a minimum size which provides an inherent limit on the number of leaves, further limiting tree complexity.

The present invention solves the problem of poor multi-modal performance in Bayesian classifiers by using the tree structure to address modality by reducing the number of different modes presented to the Bayesian classifiers in the leaf nodes. The data is split at branch nodes during the training phase, and the splitting process tends to group the data in modes. By the time data is presented to a Bayesian classifier in a leaf node, therefore, much of the modality has been removed.

In the present invention, the tree structure is used for something trees are very good for: addressing modality, and Bayesian classifiers are used for what they are best at: accurate classification of data of limited modality. The invention combines the strengths of the techniques of the prior art in a novel, inventive fashion that eliminates or greatly reduces their weaknesses. This is particularly important in the example of classifying engine firing conditions because determining engine conditions at medium speeds or low speeds is a very different problem from determining conditions at high speeds: engine data are highly multi-modal.

The present invention relates to a method for machine learning and the preferred embodiment as described involves detecting engine misfires. Engine misfires results in a losses of energy. The feature vector selected for this example therefore needs to include energy changes. The first energy difference should correlate very strongly with the presence or absence of an engine misfire. Detection of misfires is a problem at high engine speeds due to torsional vibrations of the crankshaft and lags in the sampling process. The present invention introduces the analysis of higher order differences to aid in the diagnosis under such conditions and to attain high accuracy using the method of the invention.

In a classifier tree structure, as in any binary tree, nodes are either branch nodes or leaf nodes. Branch nodes have a left and right subtree. A branch node hyperplane is associated with each branch node. The branch node hyperplane is represented by two n-vectors: a point on the plane and the normal to the plane, where n is the dimensionality of the feature vector. A leaf node classifier is associated with each leaf node. A Bayesian classifier is described in terms of statistical "mixtures" for each of the classes. There are two classes and therefore two mixtures in the leaf nodes for the engine problem: nominal engine firings and misfires. Each mixture contains one or more multi-variate Gaussian probability distributions, or kernels.

At the beginning of the training component, the root of the tree, the first branch node, is constructed using the entire set of training data. Each branch node splits the training data for that branch node into two subsets. In the invention, two independent subtrees for each subset are constructed.

For the node construction process, a hypothesis is made that the node to be constructed is a leaf node. Given this hypothesis, a leaf node classifier is constructed for all of the training data in the node.

Next, the classifier just constructed is applied to the applicable training data to form a "confusion matrix". The confusion matrix comprising four numbers: $n_{00}$, the number of correct identifications of nominal firings; $n_{11}$, the number of correct identifications of misfires; $n_{01}$, the number of incorrect identifications of nominal firings as misfires, and $n_{10}$, the number of incorrect identifications of misfires as nominal firings.

Then the four numbers in the confusion matrix are used to form a single number. In the preferred embodiment, the method of combining the four numbers into a single number is the calculation of Fisher's kappa statistic:

$$n_{ox} = n_{00} + n_{01}$$

$$n_{1x} = n_{10} + n_{11}$$

$$n_{xo} = n_{00} + n_{10}$$

$$n_{x1} = n_{01} + n_{11}$$

$$n = n_{0x} + n_{1x}$$

$$n_d = n_{00} + n_{11}$$

$$\kappa = \frac{n \cdot n_d - (n_{0x} \cdot n_{xo} + n_{1x} \cdot n_{x0})}{n^2 - (n_{0x} \cdot n_{xo} + n_{1x} \cdot n_{x0})}$$

Finally, the kappa is compared with a kappa threshold. If the result exceeds the threshold, then the hypothesis is true, the node is a leaf node, and the method terminates. If the result does not exceed the threshold, then the node must be a branch node.

A branch node is described by a branch node hyperplane. Using the core of the EM method to build this branch node hyperplane, a two kernel mixture that describes all of the data it (nominal and misfire) in the node is created. The boundary between the two kernels is a hyperellipse. Using this hyperellipse directly as a splitting mechanism would (1) be computationally inefficient, and (2) run into problems at points far from the center of the hyperellipse. Instead, in the present invention, the two kernels constructed by the EM method as an aid in building a computationally efficient splitting hyperplane. The point on the branch node hyperplane is deemed to be the point along the line connecting the centers of the two kernels that minimizes the sum of the Mahanoblis distances between the point and each kernel. The hyperplane normal is the normal to the constant Mahanoblis distance hyperellipse that passes through this point. The training data for the branch node is split into two subsets depending on which side of the branch node hyperplane each element of the training data reside.

The end result of building a leaf node classifier is a pair of "mixtures," one for the nominal data and another for the misfire data. Using the EM algorithm to form each mixture, four types of data can be used:

(1) Observable data—the feature vectors (2) Model parameters—the Gaussian kernel descriptions (3) Unobservable data—fuzzy membership of the feature vectors in the Gaussian kernels, and (4) Combined likelihoods of all of the feature vectors with respect to the mixture.

The method of the invention maximizes the latter piece of unobservable data, the combined likelihoods, by repeatedly building the model parameters based on estimates of the unobservable data.

To constrain the method, limitations are inserted for:

(a) kernels in the mixture to some range (e.g., 2 to 4 kernels)

(b) attempts at building a mixture (e.g., 20 attempts), and (c) iterations inside the EM method itself.

The tree traversal method in classification operations entails determining on which side of a branch node hyperplane the n-dimensional point to be classified, that is, the feature vector, resides. This representation of the branch node hyperplane makes this sidedness calculation very simple, calculate the inner product of the hyperplane normal with the difference between the hyperplane point and the feature vector to be classified. The algebraic sign of the result indicates on which side of the branch node hyperplane the point to be classified resides. If the result is negative, the tree traversal method takes the left subtree, and the right subtree otherwise. This method is applied repeatedly until a leaf node is reached.

The leaf node classifier at the leaf node is used to compute the likelihoods that the feature vector in question represents a nominal engine firing and a misfire. The classification assigned to the point in question is the class with the higher likelihood. Each class (nominal and misfire) has its own independent mixture in a leaf classifier data structure. Each mixture in turn comprises one or more weighted kernels. The log likelihood for each kernel is computed based on the Mahanoblis distance between the point to be classified and the kernel, the size of the kernel, and some normalizing factors. The log likelihood for each mixture is the log of the weighted sum of the kernel likelihoods.

Once the mixture log likelihoods for the two classes have been calculated, the final step of deciding to which class the feature vector to be classified belongs is simple: it is the class with the higher log likelihood value.

DETAILED DESCRIPTION OF THE PREFERRED EMBODIMENTS

Definitions

Figure 4:
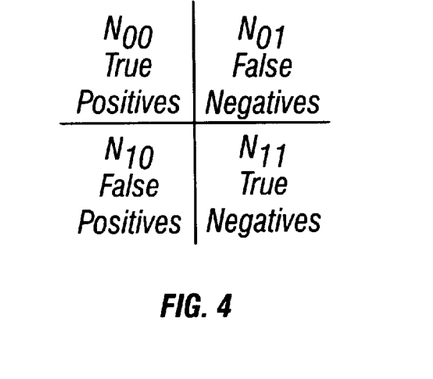
FIG. 4 is an example of a confusion matrix.

"Feature vector" means a set of observable data to be classified excluding the classification itself. In the preferred embodiment classifying engine firing conditions as nominal firings or misfires, the feature vector is a set of data elements comprising eight elements: the engine load, the engine energy defined as engine speed squared, and the six central energy differences derived as shown on FIG. 4.

"Engine load" means a raw number between 0 and 1 determined according to the fuel-air mixture of the engine.

A "kernel" is a multi-dimensional Gaussian probability distribution defined over a subset of training data by a mean and the inverse of a covariance matrix.

The "mean" of a kernel is the weighted arithmetic mean of the training data.

A covariance matrix is the matrix each element of which comprises the variance between corresponding elements of the training data.

A "mixture" comprises kernels and kernel weights, each kernel having a corresponding kernel weight.

A "kernel weight" is a normalized representation of the effect of a kernel in the mixture log likelihood. Kernel weight is proportional to the total fuzzy data membership of a kernel.

"Test data" comprises sets of feature vectors and corresponding classifications as nominal firings or misfires. Test data is used to evaluate a binary classification tree's performance as a classifier. Test data is not used to create binary classification trees.

"Training data" comprises sets of feature vectors and corresponding classifications as nominal firings or misfires. Training data is used to create a binary classification tree for use as a classifier.

"Classification data" means a set of feature vectors to be classified as nominal firings or misfires.

A "leaf node classifier" comprises two mixtures, one for nominal engine firing data and one for misfires.

"Mahanoblis distance" means the distance between a feature vector x and kernel with mean m and covariance C according to:

$$(x-m)^T C^{-1} (x-m).$$

The "EM algorithm", meaning the "Expectation Maximization algorithm", is a known method for constructing statistical mixtures, more specifically comprising the following steps:

a. establishing calculation constraints comprising the maximum number of kernels in a mixture, the maximum permissible number of attempts at building a mixture, and the maximum permissible number of iterations of the calculation;

b. establishing a first combined likelihood as a large negative number so that any subsequent combined likelihood is certain to be greater than the first combined likelihood;

c. assigning randomly to each feature vector a fuzzy membership for each kernel;

d. computing a new mean and covariance for each kernel by using the current fuzzy membership values to weight each feature vector;

e. computing new fuzzy membership values as normalized Mahanoblis distances from each feature vector to each kernel;

f. calculating a second combined likelihood for all the feature vectors with respect to the mixture;

g. comparing the first combined likelihood and the second combined likelihood to determine which of the mixtures yielded the highest combined likelihood;

h. assigning the highest combined likelihood to be the first combined likelihood;

i. saving the mixture associated with the first combined likelihood;

j. repeating steps d through i until a calculation restraint is exceeded; and k. repeating steps c through j until a calculation restraint is exceeded;

The "kernel log likelihood" means the log likelihood computed by use of the Mahanoblis distance between the actual data point and the kernel, the size of the kernel, and normalizing factors, where the kernel log likelihood of a feature vector x with respect to a kernel with mean m, covariance C, and dimension n is:

$$\frac{1}{2}(x-m)^T C^{-1}(x-m) + \frac{1}{2}\log|C| + \frac{n}{2}\log 2\pi.$$

The "kernel likelihood" is $e^{kernel\ log\ likelihood}$.

The "mixture log likelihood" is the log of the weighted sum of the kernel likelihoods for all kernels in the mixture, wherein the mixture log likelihood of point x with respect to a mixture is:

$$\log \sum_{kernel} (e^{kernelloglikelihood(x, kernel)}) weight(kernel).$$

"Automotive engine firing conditions" are either nominal or misfire. The assignation of a condition is made anew each time a cylinder reaches the firing stroke in the engine cycle.

"Binary classifier tree" is a binary tree with branch node hyperplanes that direct traversal at the branch nodes and leaf node classifiers at the leaf nodes.

A "branch node" is a non-terminal node in the binary classifier tree. A branch node comprises a branch node hyperplane and pointers to two child nodes.

A "leaf node" is a terminal node in the binary classifier tree. A leaf node comprises a leaf node classifier.

The "kappa threshold" is a user-supplied threshold on the kappa statistic. The best practice value determined by experimentation is 0.97 for the example of classifying engine firing conditions.

The "minimum dataset size" is a user-determined minimum beyond which the binary classifier tree is not to be branched. Use of a minimum dataset size has the beneficial effect of limiting the complexity of the binary classifier tree. It also reduces the risk of over specialization, or learning idiosyncratic behavior, that can result from the creation of too complex a binary classifier tree.

A "hyperplane" is an infinite set of points splitting the space in which it is defined and having dimensionality one less than the dimensionality of the space in which the hyperplane is defined. In the preferred embodiment, the branch node hyperplanes in the branch nodes have dimensionality one less than the dimensionality of the feature vectors. Hyperplanes can be defined by a point in the hyperplane referred to as a "hyperplane point" and a vector normal to the hyperplane referred to as a "hyperplane normal."

An "equivocation hyperconic section" is the locus of points for which the Mahanoblis distances between the points and the branch mixture kernels are the same. The branch mixture kernels are the kernels used to create branch node hyperplanes.

Training

Figure 1:
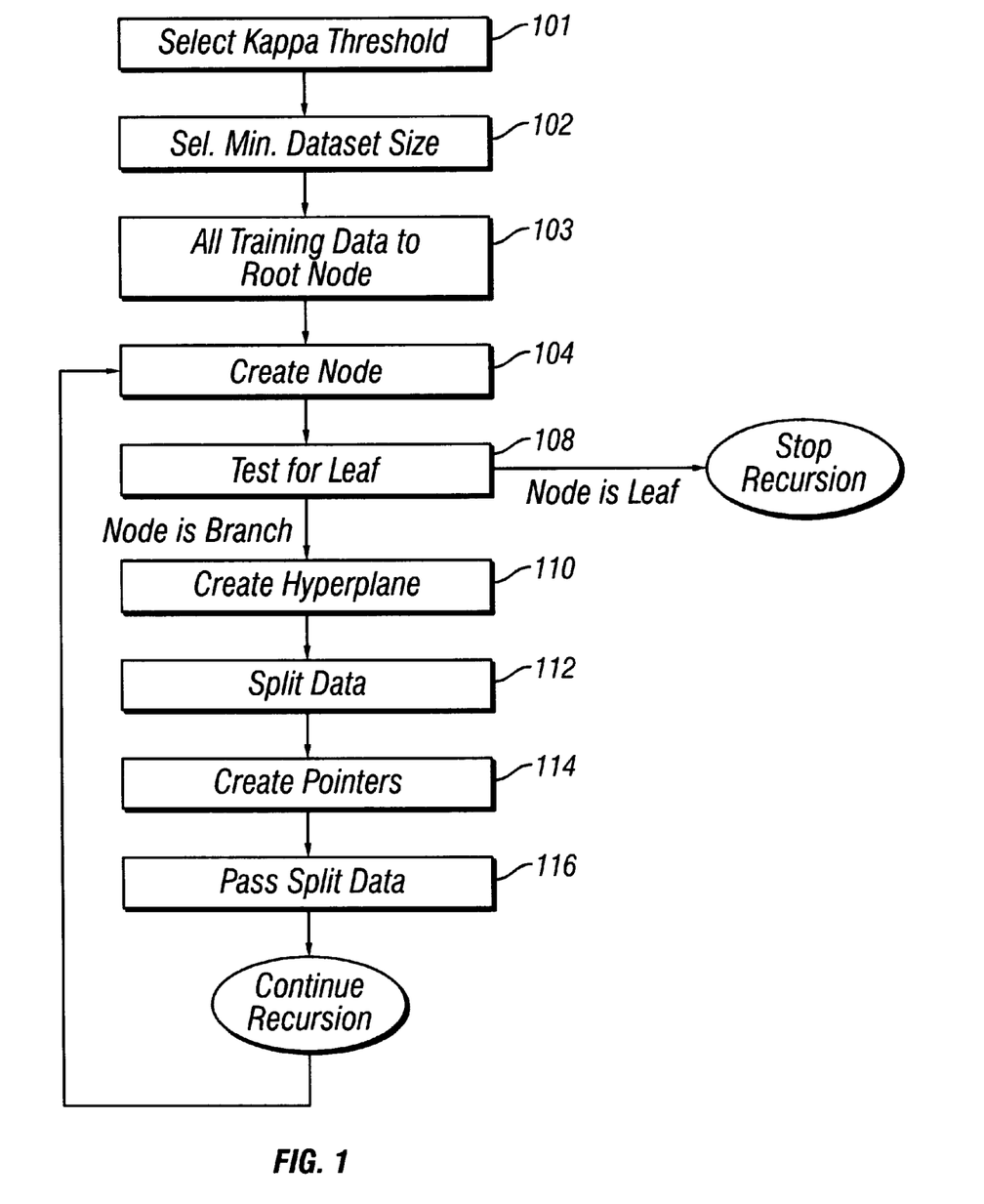
FIG. 1 is a chart of the training component of the invention.

As with many machine learning methods, the present inventions comprises two broad components: training and operation. Referring to FIG. 1: The training component comprises recursive creation of a binary tree by determining a kappa threshold 101 and a minimum dataset size 102, creating a node 104 to which all training data is passed 103 in the case of the root node, determining by statistical test whether the node just created is a leaf node or a branch node 106, creating branch node hyperplanes for branch nodes 110, splitting the data for branch nodes into two subsets 112, creating for the branch nodes pointers to the next level of nodes 114, and passing the subsets 116 to the next level of nodes recursively to be created.

The stopping point for the recursion is the creation of a node which is determined by the statistical test to be a leaf node 108. In operation, the classification in the present invention is not merely a data point in the leaf nodes, as was true in prior art. In the invention, classification depends on additional calculation to be performed using data stored in the leaf nodes. The test during training 106 whether a node is a branch or a leaf is made after the node is created 104.

The process of creating a node always includes passing to the node 102, 116 the training data for use in determining whether the node is a leaf or a branch. The data used to determine whether the node is a leaf is the same data that will be used later during operation to calculate classification, if the node is a leaf node. When leaf nodes are created, therefore, they already contain all the data they need for operation. When the training component determines by statistical test that a new node is a leaf node 106, therefore, recursion simply ceases 108, leaving the leaf node in complete readiness for use in operation.

The kappa threshold is determined 101 by experiment to be a comparison threshold for identifying leaf nodes. Because the invention can be used with an extremely wide variety of data, no generalization is possible regarding the best value of kappa threshold. The best mode kappa threshold value determined by experiment in the example of the engine condition data is a kappa value of approximately 0.97.

Similarly, the minimum dataset size is determined 102 by experiment to be a size that optimally balances tree complexity with accurate classification. Because the invention can be used with an extremely wide variety of data and kinds of data, no generalization is possible regarding the best minimum dataset size. Although the minimum dataset size was often set as low as 10 during testing of the invention, the inventor's estimate of the best mode minimum dataset size in the example of the engine condition data is approximately 100.

Figure 2:
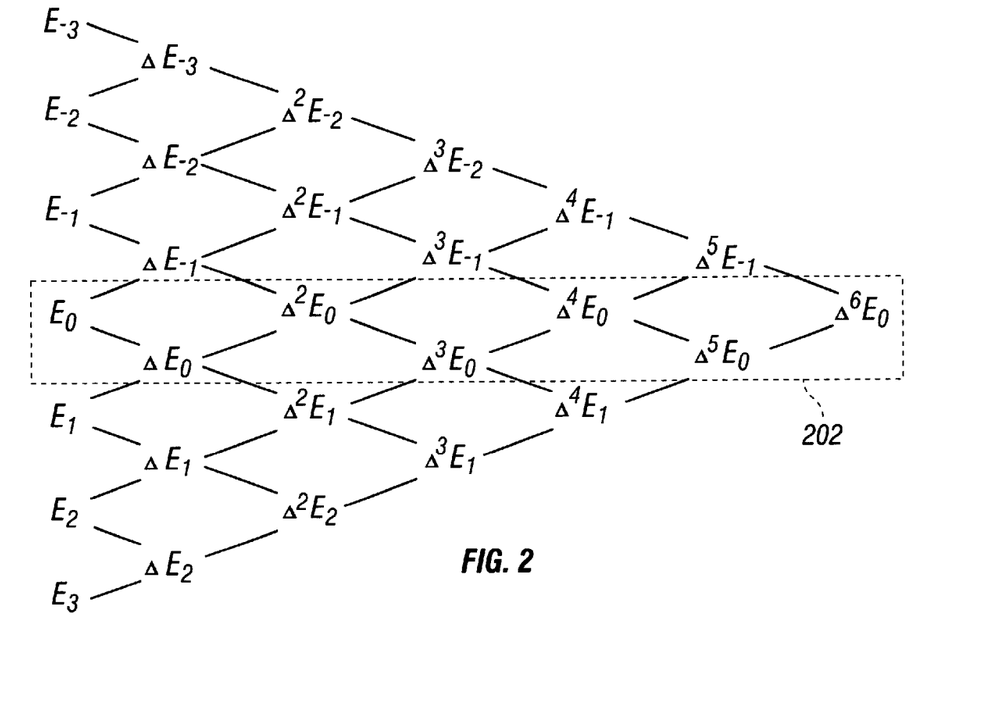
FIG. 2 is diagram of the derivation of the energy elements in the feature vector for the example of classifying engine. firing conditions.

All new nodes comprise initially training data having a dataset size and further comprising multiples sets of feature vectors and training classifications. In the example of the engine condition training problem, the feature vectors include the engine load, the engine energy $E_0$ defined as engine speed squared, and the six central energy differences, $\Delta E_0, \Delta^2 E_0, \Delta^3 E_0, \Delta^4 E_0, \Delta^5 E_0, \Delta^6 E_0$, derived as shown on FIG. 2 and selected as shown by the box identified by reference number 202. In the example of the engine firing condition, the training classifications are engine firing conditions, indications of nominal firing or misfire.

Figure 3:
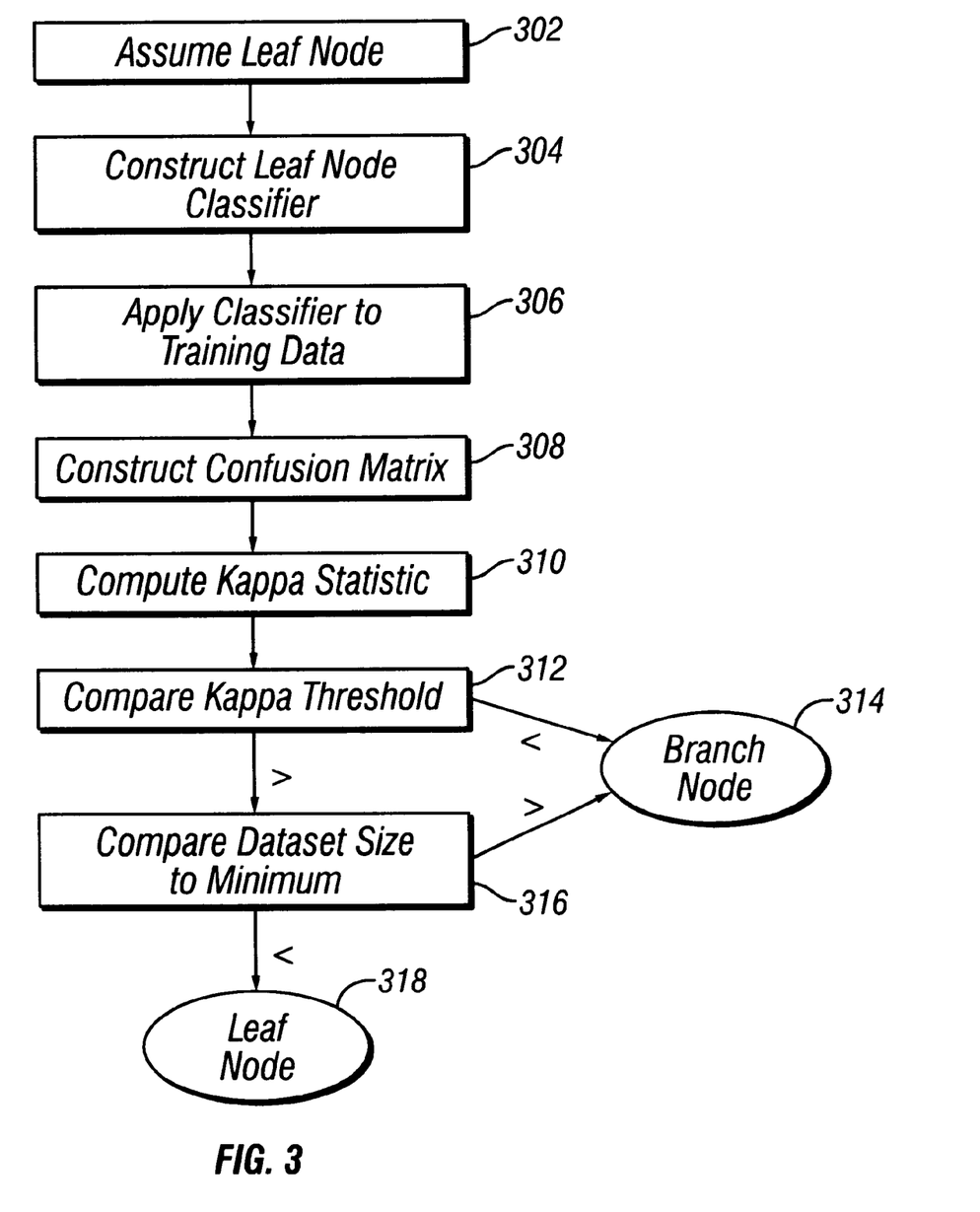
FIG. 3 is a diagram of the process of determining whether a node is a branch node or a leaf node.

Referring to FIG. 3: The determination whether the node just constructed is a leaf node or a branch node proceeds by first assuming that the node is a leaf node 302. Then a leaf node classifier for all of the training data in the node is constructed 304 by use of the EM algorithm. A confusion matrix is then formed 308 by applying the leaf node classifier to the training data in the node 306.

Confusion matrices comprise $m^2$ numbers, where m is the number of classes represented by mixtures in a leaf node classifier, and the $ij^{th}$ element of the matrix is the number of training feature vectors belonging to class i and classified in class j. In the preferred embodiment, the example of classifying engine condition data, the confusion matrix comprises four numbers: the number of correct identifications of nominal firings, the number of correct identifications of misfires, the number of incorrect identifications of nominal firings as misfires, and the number of incorrect identifications of misfires as nominal firings. See FIG. 4 for an example of a confusion matrix.

The kappa statistic is then computed 310 from the four numbers in the confusion matrix. In the preferred embodiment, the method of combining the four numbers into a single number is the calculation of Fisher's kappa statistic:

$$n_{ox} = n_{00} + n_{01}$$

$$n_{1x} = n_{10} + n_{11}$$

$$n_{xo} = n_{00} + n_{10}$$

$$n_{x1} = n_{01} + n_{11}$$

$$n = n_{0x} + n_{1x}$$

$$n_d = n_{00} + n_{11}$$

$$\kappa = \frac{n \cdot n_d - (n_{0x} \cdot n_{xo} + n_{1x} \cdot n_{x0})}{n^2 - (n_{0x} \cdot n_{xo} + n_{1x} \cdot n_{x0})}$$

The general expression for the kappa statistic is:

$$n_{ix} = \sum_j n_{ij} \text{ for each } i$$

$$n_{xi} = \sum_j n_{ji} \text{ for each } i$$

$$n_d = \sum_j n_{jj}$$

$$n = \sum_i n_{ix}$$

$$\kappa = \frac{n \cdot n_d - \sum_i n_{ix} n_{xi}}{n \cdot n - \sum_i n_{ix} n_{xi}}$$

The kappa statistic so computed is then compared to the kappa threshold 312. If the kappa statistic is less than the kappa threshold, the node is tentatively determined to be a branch node 314, unless the dataset size in the node is smaller than the minimum dataset size. If the node dataset size is smaller-than the minimum dataset size, then the node is determined to be a leaf node 318.

Figure 5:
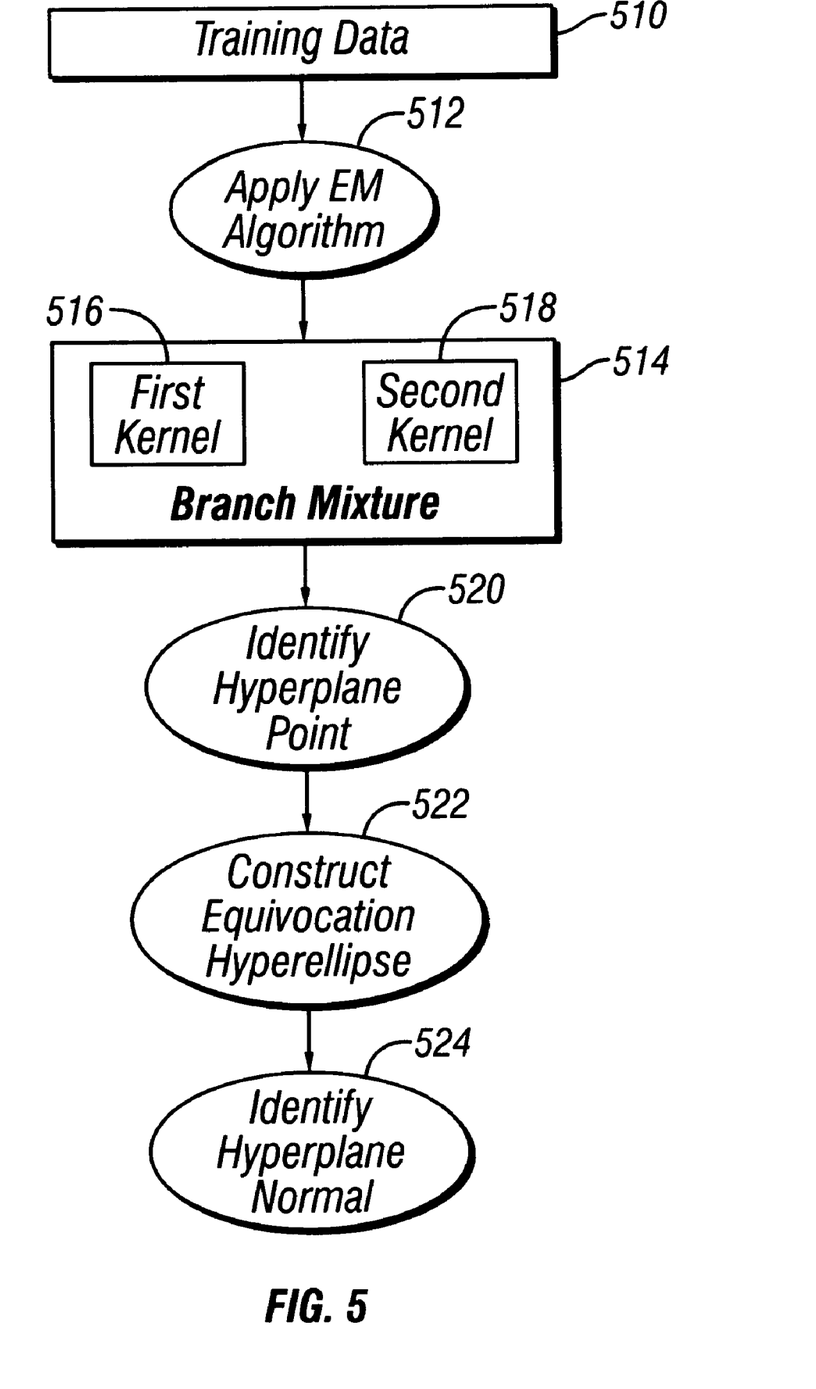
FIG. 5 is a diagram of the process of calculating a hyperplane for a branch node.

Referring again to FIG. 1: For each node tentatively determined to be a branch node, the invention attempts to create a branch node hyperplane 110 comprising a hyperplane point and a hyperplane normal. The branch node hyperplane is created by use of the EM algorithm. The branch node hyperplane is constructed by first constructing a branch mixture 514 comprising two kernels, a first branch mixture kernel 516 and a second branch mixture kernel 518, by applying the EM algorithm 512 against all the training data in the branch node.

The creation of the branch node hyperplane is said to be an attempt because it is possible that one of the kernels will be so large as to subsume the other, in which case, the hyperplane point might not exist. If the hyperplane point is found not to exist, then the node is determined to be a leaf node. If the hyperplane point does exist, then the point tentatively identified as a branch node is confirmed as a branch node.

The hyperplane point is calculated 520 by identifying the point, if any, along the line connecting the centers of the two branch mixture kernels that has equal kernel log likelihoods with respect to each kernel. The hyperplane point is the smallest positive solution $\lambda$ to the quadratic form kernel log likelihood $(m_1+\lambda(m_2-m_1), \text{kernel}_1)$=kernel log likelihood $(m_2-\lambda(m_2-m_1), \text{kernel}_2)$ where $m_1$ is the mean for kernel number 1 and $m_2$ is the mean for kernel number 2.

Then an equivocation hyperconic section is constructed 522 comprising the points for which the Mahanoblis distances between the points and the branch mixture kernels are the same.

The equivocation hyperconic section is $$(x-m_e)^T C_e^{-1}(x-m_e)$$

where $$C_e^{-1}=C_2^{-1}-C_1^{-1}$$

$$m_e-m_1+C_e C_2^{-1}(m_2-m_1)$$

if $$(m_2-m_1)^T C_2^{-1}(m_2-m_1)>(m_2-m_1)^T C_1^{-1}(m_2-m_1),$$

otherwise $$C_e^{-1}=C_1^{-1}-C_2^{-1}$$

$$m_e-m_2+C_e C_1^{-1}(m_1-m_2).$$

Finally, the hyperplane normal is calculated 524 as the normal to the equivocation hyperconic section at the hyperplane point. The hyperplane normal is $$C_e^{-1}(m_1+\lambda x(m_2-m_1)-m_e).$$

The hyperplane normal can be computed directly after computing $\lambda$ via $$(\lambda C_1^{-1}+(1-\lambda)C_1^{-1})(m_2-m_1).$$

The preferred embodiment uses this latter computation instead of computing the equivocation hyperconic section.

Figure 6:
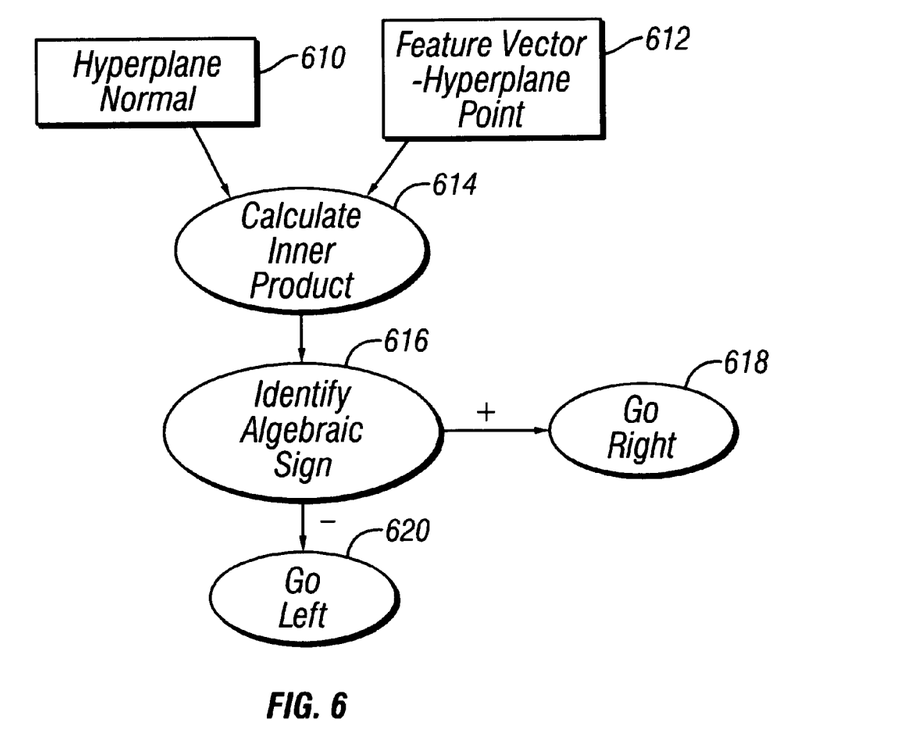
FIG. 6 is a diagram of the traversal process for the present invention, used in the training component to split data and in the operation component to decide traversal direction.

Referring back to FIG. 1, after creating the branch node hyperplane, for each branch node, the training data for the node is split 112 into two subsets, a left subset and a right subset, according to which side of the branch node hyperplane each element of training data resides, the side being determined, as shown on FIG. 6, by calculating the inner product 614 of the hyperplane normal 610 with the difference between the hyperplane point and the feature vector to be calculated 612, identifying the algebraic sign of the result 616, and determining the side to be the left side if the algebraic sign is negative 620 and the right side if the algebraic sign is positive 618.

Referring back to FIG. 1, for each branch node, creating pointers 114 including a left is node pointer and a right node pointer for pointing to a next layer of nodes recursively to be created in the binary classifier tree.

For each branch node, passing the subsets 116 to the next nodes recursively to be created by passing the left subset to the next left node and the right subset to the next right node.

Classification Operation

Figure 7:
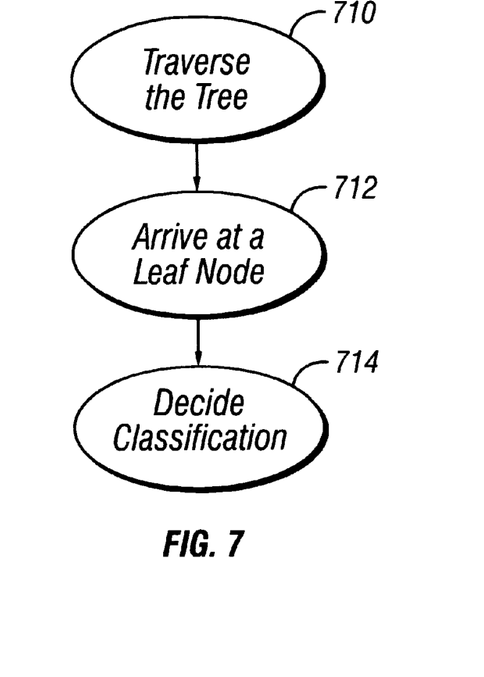
FIG. 7 is a diagram of the operation component.

Classification operation or "operation" is the process of determining whether a feature vector is to be classified as belonging to a pattern or not belonging. In the example of the engine condition classification, the operation process determines whether a feature vector represents a nominal engine firing or a misfire. Referring to FIG. 7: Operation includes the steps of traversing the classifier tree 710 with a feature vector to be classified until a leaf node is reached 712 and deciding upon arriving at a leaf node how to classify the feature vector 714.

Referring again to FIG. 6: traversing the classifier tree involves calculating for each branch node visited the inner product 614 of the branch node's hyperplane normal 610 with the difference between the hyperplane point and the feature vector to be classified 612. The algebraic sign of the inner product is then determined 616, and the tree is then traversed to the left 620 if the algebraic sign is negative and to the right if the algebraic sum is positive 618. This process of calculating inner products 614, determining algebraic signs 616, and traversing the tree 618, 620 is repeated recursively until a leaf node is reached.

In the prior art of tree classifiers, arriving at a leaf node automatically classified the feature vector because the only data in the leaf node would be the classification. In the present invention, the leaf nodes contain, not classifications, but data from which classifications can be calculated. In the example of the engine firing conditions, the leaf node data comprises two mixtures, one for misfires, one for nominal engine firings.

Figure 8:
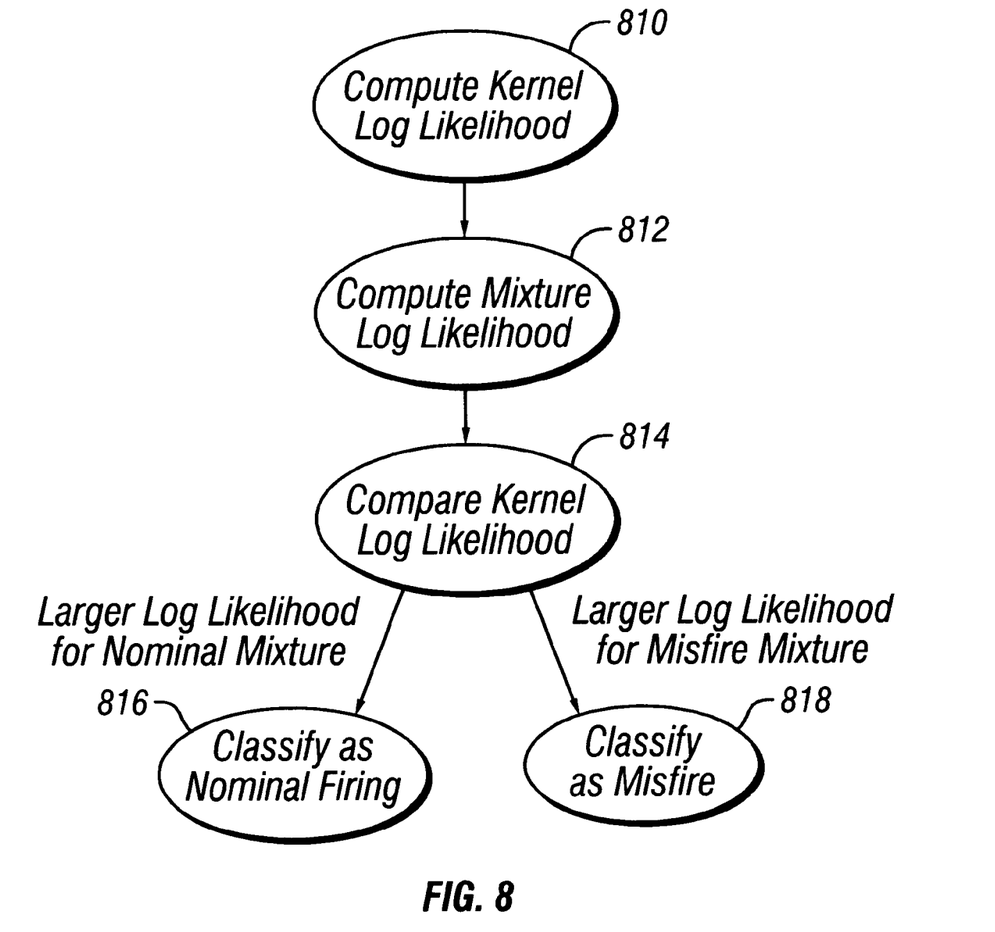
FIG. 8 is a diagram of the process of deciding how to classify a feature vector.

The first step upon arriving at a leaf node is to compute the kernel log likelihood for the feature vector for each kernel in the leaf node 810. The kernel log likelihoods are computed by use of the Mahanoblis distance between the actual data point and the kernel, the size of the kernel, and the normalizing factors. The kernel log likelihood of a feature vector x with respect to a kernel with mean m, covariance C, and dimension n is:

$$\frac{1}{2}(x-m)^T C^{-1}(x-m) + \frac{1}{2}\log|C| + \frac{n}{2}\log 2\pi.$$

After computing the kernel log likelihoods 810, the mixture log likelihood is computed for each mixture in the leaf node classifier 812. The mixture log likelihood for each mixture comprises the log of the weighted sum of the kernel likelihoods for all kernels in the mixture. The mixture log likelihood of point x with respect to a mixture is:

$$\log \sum_{kernel} (e^{kernelloglikelihood(x,kernel)}) weight(kernel).$$

The feature vector is then classified by comparing the mixture log likelihoods 814. In the example of engine firing conditions, the feature vector is classified as representing a nominal firing or a misfire. The feature vector is classified as representing a nominal engine firing 816 if the mixture log likelihood for the nominal mixture was higher than the mixture log likelihood for the misfire. mixture, and the feature vector is classified as representing an engine misfire 818 if the mixture log likelihood for the misfire mixture was higher than the mixture log likelihood for the nominal mixture.

What is claimed is:

1. A method utilizing machine-readable data storage of a set of machine-executable instructions for using a data processing system to perform a method of machine learning in which the learning is an assignment of a feature vector to a classification carried out by recursively creating and using first, a binary classifier tree having nodes, which nodes further comprise branch nodes and leaf nodes, and second, an Bayesian classifier and the method comprising the steps of:
   a. using a binary tree classifier to create a node, wherein the node comprises training data having a dataset size, the training data comprising multiple sets of feature vectors and corresponding classifications;
   b. hypothesizing the node just constructed is a leaf node;
   c. constructing a Bayesian leaf node classifier for the node;
   d. testing the hypothesis by applying the leaf node classifier against the training data and if the hypothesis is correct then the node is a leaf node, if the hypothesis fails, then the node is a branch node;
   e. creating, for each node determined to be a branch node, a branch node hyperplane comprising a hyperplane point and a hyperplane normal;
   f. splitting for each node determined to be a branch node, the training data for the branch node into two subsets, a left subset and a right subset, according to which side of the branch node hyperplane each element of training data resides; and
   g. passing the subsets to the next nodes recursively to create a tree.

2. The method of claim 1 further comprising the steps of:
   a. constructing a leaf node classifier for all of the training data in the node by use of the Expectation Maximization "EM" algorithm;
   b. forming a confusion matrix comprising $m^2$ numbers, where m is the number of classes represented by mixtures in a leaf node classifier and $ij^{th}$ element of the matrix comprises the number of training feature vectors belonging to class i and classified in class j;
   c. computing the kappa statistic from the numbers in the confusion matrix;
   d. comparing the kappa statistic to the kappa threshold;
   e. determining the node to be a branch node if the kappa statistic is less than the kappa threshold;
   f. comparing the dataset size of the training data to the minimum dataset size; and
   g. determining the node to be a branch node if the dataset size of the training data is less than the minimum dataset size.

3. The method of claim 2 wherein the step of creating a branch node hyperplane further comprises the steps of:
   a. constructing a branch mixture comprising two kernels, a first branch mixture kernel and a second branch mixture kernel, wherein the branch mixture is constructed by using the EM algorithm with all the training data in the branch node;
   b. attempting to calculate the hyperplane point by identifying the point along the line connecting the centers of the two branch mixture kernels such that the kernel log likelihoods at the hyperplane point are equal, wherein this step fails if the hyperplane point does not exist;
   c. constructing, if the hyperplane point exists, the equivocation hyperconic section comprising a locus of points for which Mahanoblis distances between the points and the branch mixture kernels are the same;
   d. calculating, if the hyperplane point exists, the hyperplane normal as the normal to the equivocation hyperconic section at the hyperplane point; and
   e. determining the node to be a leaf node if the hyperplane point does not exist.

4. The method of claim 3 wherein the step of splitting the training data further comprises the steps of:
   a. computing for each feature vector in the training data a difference vector between the hyperplane point and the feature vector;
   b. calculating an inner product of the hyperplane normal and the difference vector calculated in step a;
   c. identifying an algebraic sign of the inner product; and
   d. determining the side to be left if the algebraic sign is negative and right if the algebraic sign is positive.

5. The method of claim 1 further comprising the steps of:
   a. traversing the classifier tree with a feature vector to be classified until a leaf node is reached, wherein the tree is traversed to the left or to the right at each branch node according to whether the feature vector resides to the left or the right of the branch node hypetplane;
   b. deciding, upon arriving at a leaf node, how to classify the feature vector, wherein the decision how to classify the feature vector is made by computing log likelihoods for the feature vector for each mixture in the leaf node classifier and classifying the feature vector in the class identified by the mixture having the highest log likelihood; and
   c. whereby a feature vector is classified.

6. A method utilizing machine-readable data storage of a set of machine-executable instructions for using a data processing system to perform a method of machine learning in which the learning is an assignment of a feature vector to a classification carried out by creating and using first a binary classifier tree having nodes, which nodes further comprise branch nodes and leaf nodes and second a Bayesian classifier to obtain a result with, the method comprising the steps of:
   a. determining a kappa threshold and a minimum dataset size;
   b. using a binary tree classifier to create a node, wherein the node comprises training data having a dataset size, the training data comprising multiple sets of feature vectors and corresponding classifications;
   c. assuming that the node just constructed is a leaf node;
   d. constructing a Bayesian leaf node classifier for all of an training data in the node by use of the Expectation Maximization "EM" algorithm;

e. forming a confusion matrix comprising m² numbers, where m is the number of classes represented by mixtures in a leaf node classifier and the ij$^{th}$ element of the matrix comprises the number of training feature vectors belonging to class i and classified in class j;

f. computing a kappa statistic from the numbers in the confusion matrix;

g. comparing the kappa statistic to the kappa threshold;

h. comparing the dataset size of the training data to the minimum dataset size; and i. determining the node to be a branch node if the dataset size of the training data is exceeds the minimum dataset size;

j. creating for each node determined to be a branch node, a branch node hyperplane comprising a hyperplane point and a hyperplane normal, this step further comprising the steps of:
   (1) constructing a branch mixture comprising two kernels, a first branch mixture kernel and a second branch mixture kernel, wherein the branch mixture is constructed by using the EM algorithm with all the training data in the branch node;
   (2) calculating the hyperplane point by identifying the point along the line connecting the centers of the two branch mixture kernels such that the kernel log likelihoods at the hyperplane point are equal, wherein this step fails if the hyperplane point does not exist;
   (3) constructing, if the hyperplane point exists, the equivocation hyperconic section comprising a locus of points for which Mahanoblis distances between the points and the branch mixture kernels are the same; and
   (4) calculating the hyperplane normal as the normal to the equivocation hypereonic section at the hyperplane point;

k. determining the node to be a leaf node if the hyperplane point does not exist;

l. splitting the training data for the branch node into two subsets, a left subset and a right subset, according to which side of the branch node hyperplane each element of training data resides, this step comprising the further steps of:
   (1) computing for each feature vector in the training data a difference vector between the hyperplane point and the feature vector;
   (2) calculating an inner product of the hyperplane normal and the difference vector calculated in step a;
   (3) identifying an algebraic sign of the inner product;
   (4) determining the side to be left if the algebraic sign is negative and right if the algebraic sign is positive;

m. passing the subsets to the next nodes recursively to be created by passing the left subset to a next left node and the right subset to a next right node;

n. creating, for each node determined to be a branch node, a left node pointer and a right node pointer for pointing to a next layer of nodes recursively to be created in the binary classifier tree; and o. repeating steps b through h recursively until the application of step c or step e results in a determination that the current node is a leaf node.

7. The method of claim 6 further comprising the step of determining how a feature vector is to be classified in a class identified by a mixture in the leaf node classifier, this step comprising the further steps of:

a. traversing the classifier tree with a feature vector to be classified until a leaf node is reached, this step comprising the further steps of:
   (1) calculating for a branch node the inner product of the hyperplane normal with the difference between the hyperplane point and the feature vector;
   (2) determining an algebraic sign of the inner product;
   (3) traversing the classifier tree to a next node, wherein the traversal is to the left of the algebraic sign is negative and to the right if the algebraic sum is positive;
   (4) repeating steps 7.a (1) through 7.a. (3) until a leaf node is reached;

b. deciding, upon arriving at a leaf node, how to classify the feature vector, this step comprising the further steps of:
   (1) computing a kernel log likelihood for the feature vector with respect to each kernel in each mixture in the leaf node classifier, wherein the kernel log likelihood is computed by use of the Mahanoblis distance between the feature vector and the kernel, the size of the kernel, and normalizing factors, wherein the kernel log likelihood of a feature vector x with respect to a kernel with mean m, covariance C and dimension n is:

$$\tfrac{1}{2}(x-m)^T C(x-m) + 1/2 \log C + n/2 \log 2\pi;$$

(2) computing a mixture log likelihood for each mixture in the leaf node classifier, the log likelihood for each mixture comprising the log of the weighted sum of antlogarithms of kernel log likelihoods for all kernels in the mixture, wherein the mixture log likelihood of feature vector x with respect to a mixture is:

$$\log \Sigma_{kernal}(e^{kernel\ log\ likelihood(x,kernel)}) weight(kernel);$$

and (3) classifying the feature vector, wherein the feature vector is classified by assigning it to the class identified by the mixture having the highest mixture log likelihood among all of the mixtures in the leaf node classifier;
   (4) whereby a feature vector is classified.

8. The method of claim 6 further comprising the step of determining how a feature vector is to be classified in a class identified by a mixture in the leaf node classifier, this step comprising the further steps of:

a. traversing the classifier tree with a feature vector to be classified until a leaf node is reached, this step comprising the further steps of:
   (1) calculating an inner product of the hyperplane normal and the difference vector calculated in step a;
   (2) determining an algebraic sign of the inner product;
   (3) traversing the classifier tree to a next node, wherein the traversal is to the left if the algebraic sign is negative and to the right if the algebraic sum is positive;
   (4) repeating steps 8.a. (1) through 8.a. (3) until a leaf node is reached;

b. deciding, upon arriving at a leaf node, how to classify the feature vector, this step comprising the further steps of;
   (1) Computing a mixture log likelihood for each mixture in the leaf node classifier, this step comprising the further steps of:
      1. computing a kernel log likelihood for the feature vector with respect to each kernel in the mixture, wherein the kernel log likelihood is computed by use of the Mahanoblis distance between the feature vector and a kernel, and a kernel size, wherein the kernel log likelihood of a feature vector x with respect to a kernel with mean m, covariance C, and dimension n is:

$$\tfrac{1}{2}(x-m)^T C^{-1}(x-m) + 1/2 \log C + n/2 \log 2\pi;$$

2. combining the kernel log likelihoods into a mixture log likelihood comprising the log of the weighted sum of antilogarithms of kernel log likelihoods for all kernels in the mixture, wherein the mixture log likelihood of feature vector x with respect to a mixture is;

$$\log \Sigma_{kernel}(e^{kernel\ log\ likelihood(x,kernel)}) \text{weight(kernel)};$$

and (2) classifing the feature vector, wherein the feature vector is classified by assigning it to the class identified by the mixture having the highest mixture log likelihood among all of the mixtures in the leaf node classifier;

(3) whereby a feature vector is classified.

* * * * *